United States Patent [19]
Sakakibara et al.

[11] Patent Number: 5,660,051
[45] Date of Patent: Aug. 26, 1997

[54] AIR CONDITIONER FOR VEHICLE, USING FLAMMABLE REFRIGERANT

[75] Inventors: Hisayoshi Sakakibara, Nishio; Shin Nishida, Anjo, both of Japan

[73] Assignee: Nippondenso Co., Ltd., Kariya, Japan

[21] Appl. No.: 706,674

[22] Filed: Sep. 6, 1996

[30] Foreign Application Priority Data

Sep. 12, 1995 [JP] Japan .................. 7-234361

[51] Int. Cl.$^6$ .................. B60H 1/00; B60H 1/24
[52] U.S. Cl. .................. 62/133; 62/239; 62/114; 62/129
[58] Field of Search .................. 62/133, 129, 126, 62/239, 241, 244, 509, 114, 61, 161, 162, 295, 298, 299

[56] References Cited

U.S. PATENT DOCUMENTS 5,564,280  10/1996  Schilling et al. .................. 62/84

FOREIGN PATENT DOCUMENTS

| 167818 | 10/1982 | Japan | ................. 62/133 |
| 33517 | 2/1983 | Japan | ................. 62/133 |
| 58-54904 | 4/1983 | Japan | . |

*Primary Examiner*—William Doerrler
*Attorney, Agent, or Firm*—Harness, Dickey & Pierce

[57] ABSTRACT

In an air conditioner according to the present invention, the first and second electromagnetic valves are disposed at the outlet port and the inlet port of the condenser, which is disposed at a position away from the passenger compartment and may be easily damaged by the outer force when the vehicle collides. The first and second electromagnetic valves are closed when the outer force applied to the vehicle is equal to a predetermined value or more. In this way, an amount of leaking refrigerant is as much as the amount accumulated in the air conditioning devices at most, thus making it possible to reduce the leakage of the refrigerant.

19 Claims, 3 Drawing Sheets

1

AIR CONDITIONER FOR VEHICLE, USING FLAMMABLE REFRIGERANT

CROSS REFERENCE TO THE RELATED APPLICATION

This application is based on and claims priority of Japanese Patent Applications No. Hei. 7-234361 filed on Sep. 12, 1995, the content of which is incorporated herein by reference.

BACKGROUND OF THE INVENTION

1. Field of the Invention

The present invention relates to an air conditioner for a vehicle, which uses flammable refrigerant.

2. Related Art

As a measure for non-Freon refrigerant for an air conditioner for a vehicle, flammable refrigerant such as propane gas or the like has been recently proposed.

A method for preventing the leakage of refrigerant in an air conditioner for a vehicle, which uses flammable refrigerant, is disclosed in JP-U-58-54904. More specifically, there is provided a gas sensor for detecting leakage of the refrigerant in the passenger compartment (cabin) or in the air conditioner for the vehicle. When the leakage of the refrigerant is detected by the gas sensor, electromagnetic valves disposed at an inlet port and outlet port of an evaporator are closed to prevent the refrigerant from leaking into the passenger compartment.

In general, the vehicle is structured such that the cabin is most hardly damaged (most rigid) to ensure safety of passengers.

On the other hand, for example, when the air conditioner, in which the condenser or the like is disposed at the front part of the vehicle so as to be away from the cabin, is damaged by a collision accident of the like, refrigerant may leak from a damaged portion.

Accordingly, in case of the collision accident or the like, there is a problem that the leakage of the refrigerant from the damaged portion of the condenser or the like cannot be sufficiently prevented by closing the electromagnetic valves disposed at the inlet and outlet ports of the evaporator as described above.

SUMMARY OF THE INVENTION

In light of the above-described problem, the present invention has an object of providing an air conditioner for a vehicle, capable of reducing the leakage of refrigerant even when the vehicle is damaged by collision accidents or the like.

According to an air conditioner for cooling air by latent heat of refrigerant, of the present invention, valves are disposed at an inlet port and an outlet port of an air conditioning equipment which is positioned away from a passenger compartment and may be damaged when the outer force is applied to the vehicle, respectively. The valves are closed when the outer force is equal to a predetermined value or more.

In this way, an amount of leaking refrigerant is only as much as the amount accumulated in the air conditioning equipment, and the entire amount of refrigerant in the air conditioner does not flow outside, thus making it possible to reduce the leakage of the refrigerant.

The position of the air conditioning equipment may be the front side, or the rear side of the vehicle.

2

The outer force may be detected by an acceleration of the vehicle when the vehicle collides.

The flammable refrigerant may be used for the refrigerating cycle.

The air conditioning equipment may be a condenser for condensing the refrigerant.

A blower for generating air to be cooled may be also stopped when the outer force is equal to a predetermined value or more.

A clutch for transmitting driving force to the air conditioning equipment may stop transmitting driving force when the outer force is equal to a predetermined value or more.

BRIEF DESCRIPTION OF THE DRAWINGS

Additional object and advantages of the present invention will be more readily apparent from the following detailed description of preferred embodiments thereof when taken together with the accompanying drawings in which.

DETAILED DESCRIPTION OF THE PREFERRED EMBODIMENTS

Preferred embodiments according to the present invention will be hereinafter described with reference to the accompanying drawings.

A first embodiment of the present invention will be described.

Figure 1:
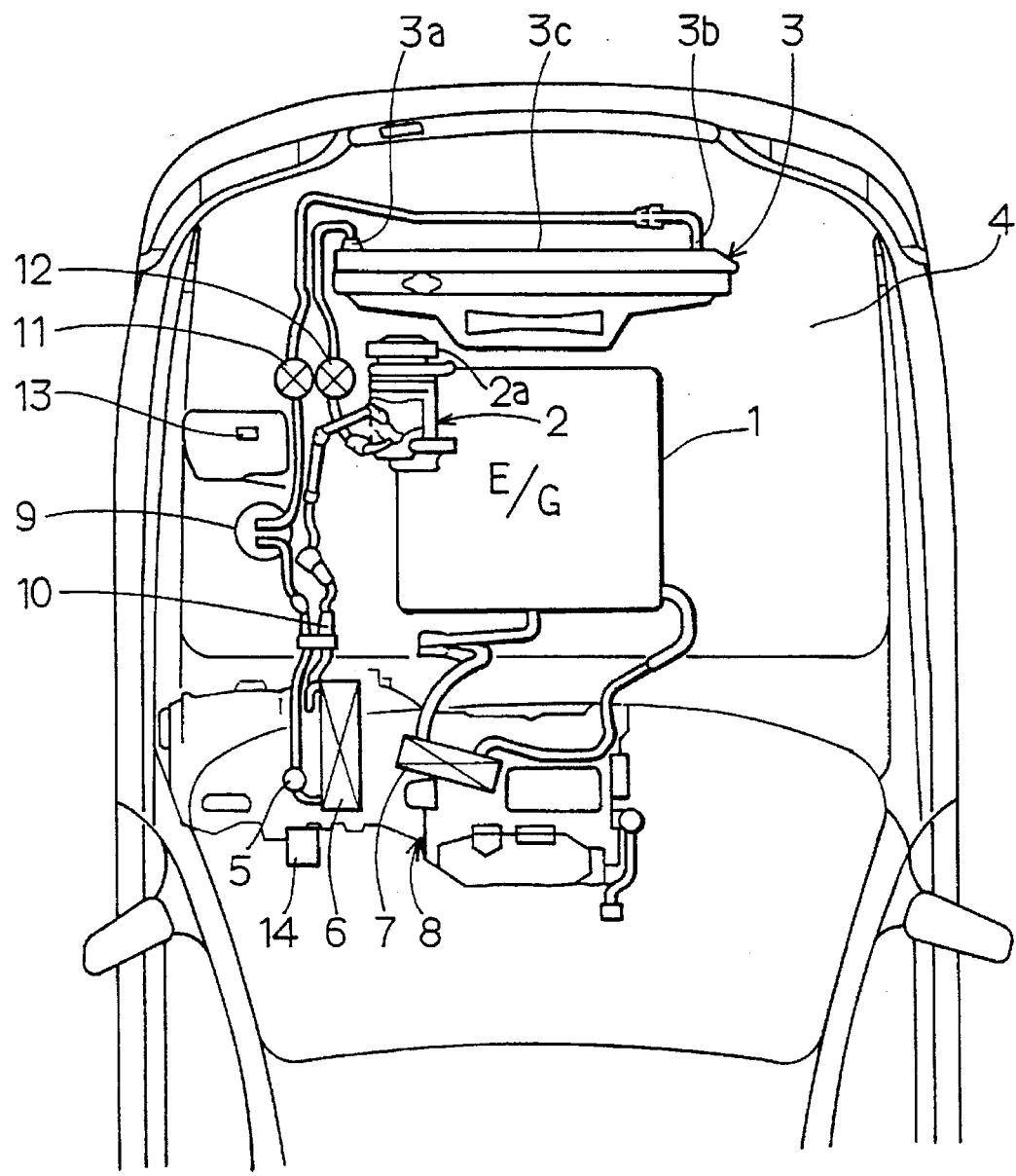
FIG. 1 is a schematic view showing a state that an air conditioner according to a first embodiment of the present invention is mounted on a vehicle.

FIG. 1 is a schematic view showing a state when an air conditioner for a vehicle (hereinafter simply called an air conditioner) according to the present invention is mounted on a vehicle where the upper part of the drawing corresponds to the front part of the vehicle. Flammable refrigerant such as propane gas or the like is used in this embodiment.

A compressor 2 is driven by driving force of an engine 1 via an electromagnetic clutch 2a.

A condenser 3 condenses the refrigerant compressed by the compressor 2 and is composed of an inlet port 3a into which the refrigerant flows, an outlet port 3b for discharging the refrigerant and a core 3c for condensing the refrigerant. The condenser 3 is usually disposed at the most front part in an engine compartment 4 to exchange heat with the refrigerant and the outside air.

An expansion valve (pressure reducer) 5 reduces the pressure of the refrigerant condensed by the condenser 3. The refrigerant becomes foggy in the expansion valve 5 so as to have a low temperature and low pressure. An evaporator 6 functions as cooling means for cooling the air. A heater core 7 for heating the air by utilizing engine cooling water as a heat source is disposed at the air downstream side of the evaporator 6.

An air mixing damper (not shown) functioning as temperature adjusting means for adjusting the air temperature blowing into the passenger compartment is disposed between the evaporator 6 and the heater core 7. The evaporator 6, the heater core 7, and the air mixing damper are disposed in an air conditioner casing 8 made of resin, which forms an air passage therein. The air conditioner casing 8 is disposed in the passenger compartment. The expansion valve 5 is disposed in the passenger compartment in the vicinity of the air conditioner casing 8.

A blower (not shown) and an inside/outside air switching casing for switching suction air are disposed at the air upstream side of the air conditioner casing 8. Air outlets (not shown) to the passenger compartment and a switching device for switching the air outlets are disposed at the air downstream side of the air conditioner casing 8.

A receiver 9 accumulates the refrigerant temporarily so as to supply the refrigerant condensed by the condenser to the evaporator 6 in quick response to a cooling load, and an evaporation pressure regulating valve 10 (EPR) regulates evaporation pressure in the evaporator 6.

Electromagnetic valves 11 and 12 are normal closed type valves which are closed when no electricity is supplied. A first electromagnetic valve 11 is disposed at the inlet port 3a of the condenser 3 and a second electromagnetic valve 12 is disposed at the outlet port 3b of the condenser 3. The Electromagnetic valves 11 and 12 are disposed at the side of the passenger compartment from the line of the front surface of the engine, thereby preventing these electromagnetic valves 11 and 12 from being damaged even when the front part of the vehicle collides and the condenser 3 is damaged. A control unit (controlling means) 14 is disposed in the vicinity of the air conditioner casing 8 in the passenger compartment and controls opening or closing of the electromagnetic valves 11 and 12 based on a detected value detected by an acceleration sensor (outer force detecting means) 13.

Figure 2:
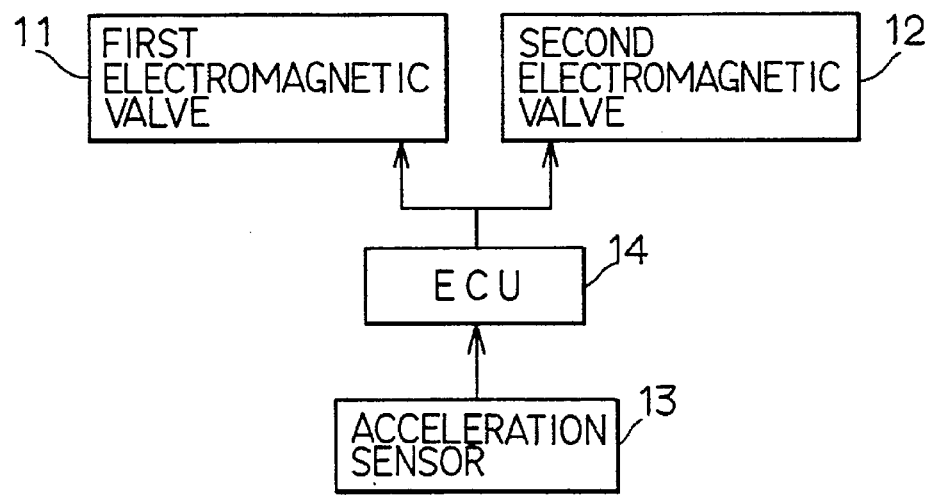
FIG. 2 is a schematic view showing a control system of valve devices according to the first embodiment.

The electromagnetic valves 11 and 12, the acceleration sensor 13 and the control unit 14 constitute a controlling system of the valve devices as shown in FIG. 2 to close the flow of the refrigerant when a vehicle collides or there is high possibility of collision. It is determined whether the vehicle collides based on acceleration of the vehicle, detected by the accelerating sensor 13.

Figure 3:
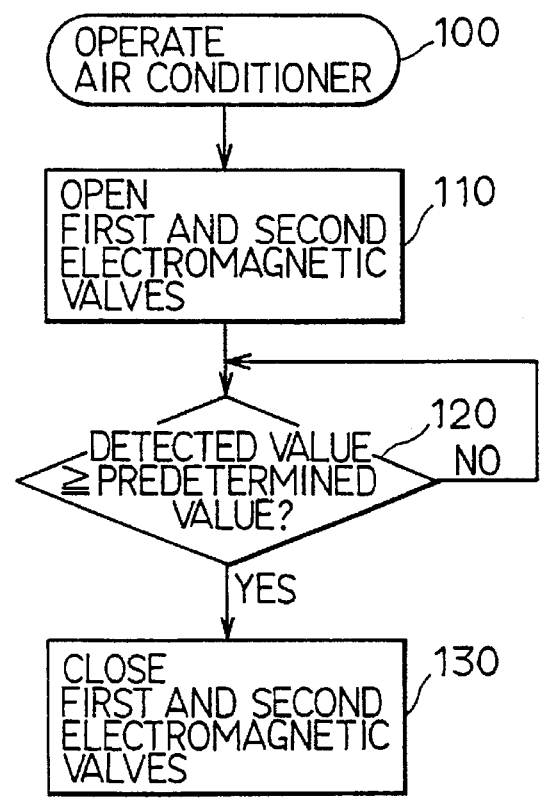
FIG. 3 is a flow chart showing a control process according to the first embodiment.

An operation of the embodiment will be described with reference to the flow chart in FIG. 3.

When the air conditioner operates, electricity is supplied to both the electromagnetic valves 11 and 12 simultaneously by an opening control signal from the control unit 14 to open both the electromagnetic valves (step 110).

The acceleration sensor 1 always monitors (step 120) an acceleration of the vehicle. In case the acceleration exceeds a predetermined value (10 m/sec$^2$ in this embodiment), electric supply to the electromagnetic valves 11 and 13 is cut off by an closing control signal from the control unit 14 to close both the electromagnetic valves (step 130).

The process of the steps 110 and 120 can be performed in parallel.

An effect of the embodiment will be described.

When the vehicle collides and its front part is damaged, the condenser 3 may be also damaged. When the condenser 3 is damaged, the refrigerant may leak from the damaged part of the condenser 3.

However, according to the present embodiment, the electromagnetic valves 11 and 12 are disposed at both the ports 3a and 3b of the condenser 3, respectively, and such electromagnetic valves 11 and 12 are closed when the vehicle collides as described above to stop the supply of the refrigerant to the condenser 3. Thus, an amount of the leaking refrigerant is only as much as the amount accumulated in the condenser 3. Since the entire amount of the refrigerant in the air conditioner does not leak outside, the leakage amount of the refrigerant can be reduced.

A second embodiment of the present invention will be described.

In this embodiment, a method for preventing the refrigerant from leaking when the vehicle collides is further improved.

Figure 4:
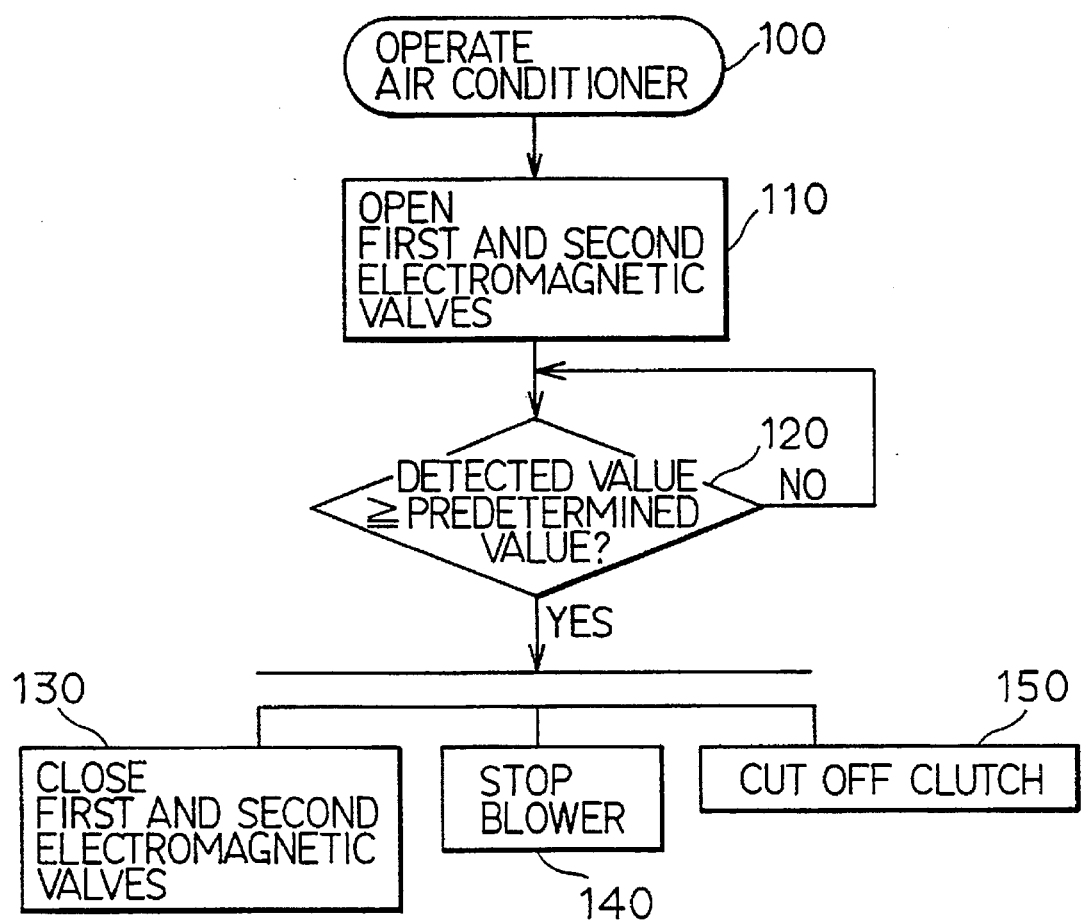
FIG. 4 is a flow chart showing a control process according to a second embodiment of the present invention.

That is, in the same constitution as in the first embodiment, the acceleration sensor 13 always monitors (step 120) the acceleration of the vehicle. When the acceleration exceeds a predetermined value, the electromagnetic valves 11 and 12 are closed (step 130), the blower is stopped (step 140), and the electromagnetic clutch 2a is cut off (step 150) as shown in FIG. 4.

The following effect can be obtained by the above operation.

The refrigerant can be prevented from leaking into the passenger compartment by stopping the blower, and therefore, safety of the passengers can be ensured.

Furthermore, the compressor as well as the flow (motion) of the refrigerant can be stopped by cutting off the electromagnetic clutch 2a, an amount of leaking refrigerant can be further reduced.

The present invention which are applied to the first and the second embodiments can be also applied to both an automatic air conditioner and a manual air conditioner. Especially, in an automatic air conditioner, the present invention can be performed by controlling both the electromagnetic valves 11 and 12 and other devices by an electronic control unit (ECU) into which the above control unit 14 is integrally incorporated.

As an outer force detecting means for determining collisions, acceleration from the acceleration sensor 13 is used as a parameter, however, a distance from the vehicle to an object (other vehicles) and a changing rate of the distance or the like, detected with supersonic, light, electronic wave or the like can be used as a parameter to perform the present invention.

A determination of the collision for operating an air bag to protect the passengers in the vehicle can be commonly used for the determination of the collision in the present invention.

Still further, according to the present invention, the first electromagnetic valve 11 disposed at the outlet port 3b of the condenser 3 may be utilized as a check valve to prevent the refrigerant from flowing toward the outlet port 3b.

Although the electromagnetic valves 11 and 12, the acceleration sensor 13 and the control unit 14 constitute an electric valve device in the above embodiments, a mechanical valve device, which closes both the ports 3a and 3b when an outer force being equal to a predetermined value or more acts on the vehicle, may be employed by utilizing the balance between elastic force of springs or the like and inertia force.

The location of both the electromagnetic valves 11 and 12 should not be limited to both the ports 3a and 3b of the condenser 3 as described in the above embodiments, however, according to the present invention, these valves 11 and 12 may be disposed at an inlet port and an outlet port of a device disposed at a position away from the passenger compartment which may be damaged easily when the vehicle collides. For example, when the receiver 9 or the expansion valve 10 is disposed at a position as to be easily damaged, the electromagnetic valves can be disposed at an inlet port and outlet port thereof.

The present invention can be applied not only to a vehicle having a so-called hood but also to a vehicle without having a hood such as so-called one-box car.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a passenger compartment, said air conditioner cooling air by evaporation latent heat of refrigerant, comprising:

air conditioning equipments for forming a refrigerating cycle in which said refrigerant flows, at least one of which is positioned away from said passenger compartment and may be damaged by outer force, said one of air conditioning equipments having an inlet port for receiving said refrigerant and an outlet port for discharging said refrigerant;

outer force detecting means for detecting outer force applied to said vehicle; and a valve device including two valves disposed at said inlet port and said outlet port, respectively, said two valves being closed when outer force detected by said outer force detecting means is equal to a predetermined value or more.

2. An air conditioner according to claim 1, wherein said outer force detecting means detects an acceleration of said vehicle as a parameter of outer force when said vehicle collides.

3. An air conditioner according to claim 1, wherein said one of air conditioning equipments is a condenser for condensing said refrigerant.

4. An air conditioner according to claim 1, further comprising:

a blower for generating air flow to be cooled by evaporation latent heat of refrigerant toward said passenger compartment, said blower being stopped when outer force detected by said outer force detecting means is equal to said predetermined value or more.

5. An air conditioner according to claim 1, further comprising:

a clutch for transmitting driving force to said air conditioning equipments, said clutch stopping transmitting driving force to said air conditioning equipments when outer force detected by said outer force detecting means is equal to said predetermined value or more.

6. An air conditioner according to claim 5, wherein said air conditioning equipments include a compressor for compressing said refrigerant, and said clutch transmits driving force to said compressor.

7. An air conditioner according to claim 1, wherein said one of said air conditioning equipments is disposed at a front part of said vehicle.

8. An air conditioner according to claim 1, wherein said refrigerant is flammable.

9. An air conditioner according to claim 1, wherein said two valves are electrically operated electromagnetic valves.

10. A air conditioner for a vehicle having a passenger compartment, said air conditioner cooling air by evaporation latent heat of refrigerant, comprising:

a condenser disposed at a front part of said vehicle and having an inlet port for receiving said refrigerant, an outlet port for discharging said refrigerant, and a core portion for condensing said refrigerant;

outer force detecting means for detecting outer force applied to said vehicle; and a valve device including two valves disposed at said inlet port and said outlet port, respectively, said two valves being closed when outer force detected by said outer force detecting means is equal to a predetermined value or more.

11. An air conditioner according to claim 10, wherein said outer force detecting means detects an acceleration of said vehicle as a parameter of outer force when said vehicle collides.

12. An air conditioner according to claim 10, further comprising:

a blower for generating air flow to be cooled by evaporation latent heat of refrigerant toward said passenger compartment, said blower being stopped when outer force detected by said outer force detecting means is equal to said predetermined value or more.

13. An air conditioner according to claim 10, further comprising:

a clutch for transmitting driving force to said air conditioning equipments, said clutch stopping transmitting driving force to said air conditioning equipments when outer force detected by said outer force detecting means is equal to said predetermined value or more.

14. An air conditioner according to claim 13, wherein said air conditioning equipments include a compressor for compressing said refrigerant, and said clutch transmits driving force to said compressor.

15. An air conditioner according to claim 10, wherein said refrigerant is flammable.

16. An air conditioner according to claim 10, wherein said two valves are electrically operated electromagnetic valves.

17. An air conditioner for a vehicle having a passenger compartment, said air conditioner cooling air by evaporation latent heat of flammable refrigerant, comprising:

air conditioning equipments for forming a refrigerating cycle in which said refrigerant flows, at least one of which is positioned away from said passenger compartment and may be damaged by outer force, said one of air conditioning equipments having an inlet port for receiving said refrigerant and an outlet port for discharging said refrigerant;

damage detecting means for detecting a physical damage of said one of air conditioning equipment; and a valve device including two valves disposed at said inlet port and said outlet port, respectively, said two valves being closed when physical damage detected by said damage detecting means is equal to a predetermined value or more.

18. An air conditioner according to claim 17, wherein said damage detecting means includes outer force detecting means for detecting outer force applied to said vehicle.

19. An air conditioner according to claim 18, wherein said outer force detecting means detects an acceleration when said vehicle collides.

* * * * *